United States Patent [19]
Eastwell

[11] Patent Number: 4,489,327
[45] Date of Patent: Dec. 18, 1984

[54] DIRECTION FINDING

[75] Inventor: John R. Eastwell, Reading, England

[73] Assignee: Racal Communications Equipment Limited, Bracknell, England

[21] Appl. No.: 361,089

[22] Filed: Mar. 23, 1982

[30] Foreign Application Priority Data

Mar. 24, 1981 [GB] United Kingdom ............... 8109105

[51] Int. Cl.$^3$ .............................................. G01S 5/04
[52] U.S. Cl. .................................... 343/432; 343/433
[58] Field of Search ............... 343/383, 417, 362, 380, 343/381, 382, 384, 432, 433, 442, 443, 444, 445, 446, 448, 424, 427, 439

[56] References Cited

U.S. PATENT DOCUMENTS

| 3,728,730 | 4/1973 | Takao et al. | 343/442 |
| 3,754,265 | 8/1973 | Markowitz | 343/439 |
| 4,307,402 | 12/1981 | Watanabe | 343/433 |

FOREIGN PATENT DOCUMENTS

| 0014215 | 11/1979 | European Pat. Off. |
| 0036531 | 9/1981 | European Pat. Off. |
| 849325 | 9/1960 | United Kingdom |
| 1260670 | 1/1972 | United Kingdom |
| 1279861 | 6/1972 | United Kingdom |
| 1366726 | 9/1974 | United Kingdom |
| 1454538 | 11/1976 | United Kingdom |
| 1475289 | 6/1977 | United Kingdom |
| 1498026 | 1/1978 | United Kingdom |
| 1518604 | 7/1978 | United Kingdom |
| 1551526 | 8/1979 | United Kingdom |
| 2044033 | 10/1980 | United Kingdom |
| 1593286 | 6/1981 | United Kingdom |

Primary Examiner—Theodore M. Blum
Assistant Examiner—John B. Sotomayor
Attorney, Agent, or Firm—Leydig, Voit, Osann, Mayer & Holt, Ltd.

[57] ABSTRACT

A direction finding system has two antennas with response patterns at 90°. A sense antenna 14 is mounted to produce a sense output dependent on the received radio signal but independent of its bearing. A commutating and combining arrangement receives the antenna outputs and produces a sequence of control signals each of which represents a respective one of the following: the North-South output, the East-West output, the sum of the NS and EW outputs, the difference between the NS and EW outputs, the sum of the NS and sense outputs, and the sum of the EW and sense outputs. A receiver produces an output having a magnitude dependent on any amplitude modulation on the received radio signal but independent of its bearing. A data processing unit (a) compares particular pairs of the control signals which are not dependent on the sense antenna output to produce a bearing output dependent on the bearing of the received radio signal but independent of its sense, (b) compares the values of specific pairs of the control signals, one of each such pair being a control signal not dependent on the sense antenna output and the other being a control signal dependent on the sense antenna output, to determine the sense of the bearing, and represented by the said bearing outputs, and (c) uses the output of the receiver to render the values of the control signals independent of any amplitude modulation.

11 Claims, 3 Drawing Figures

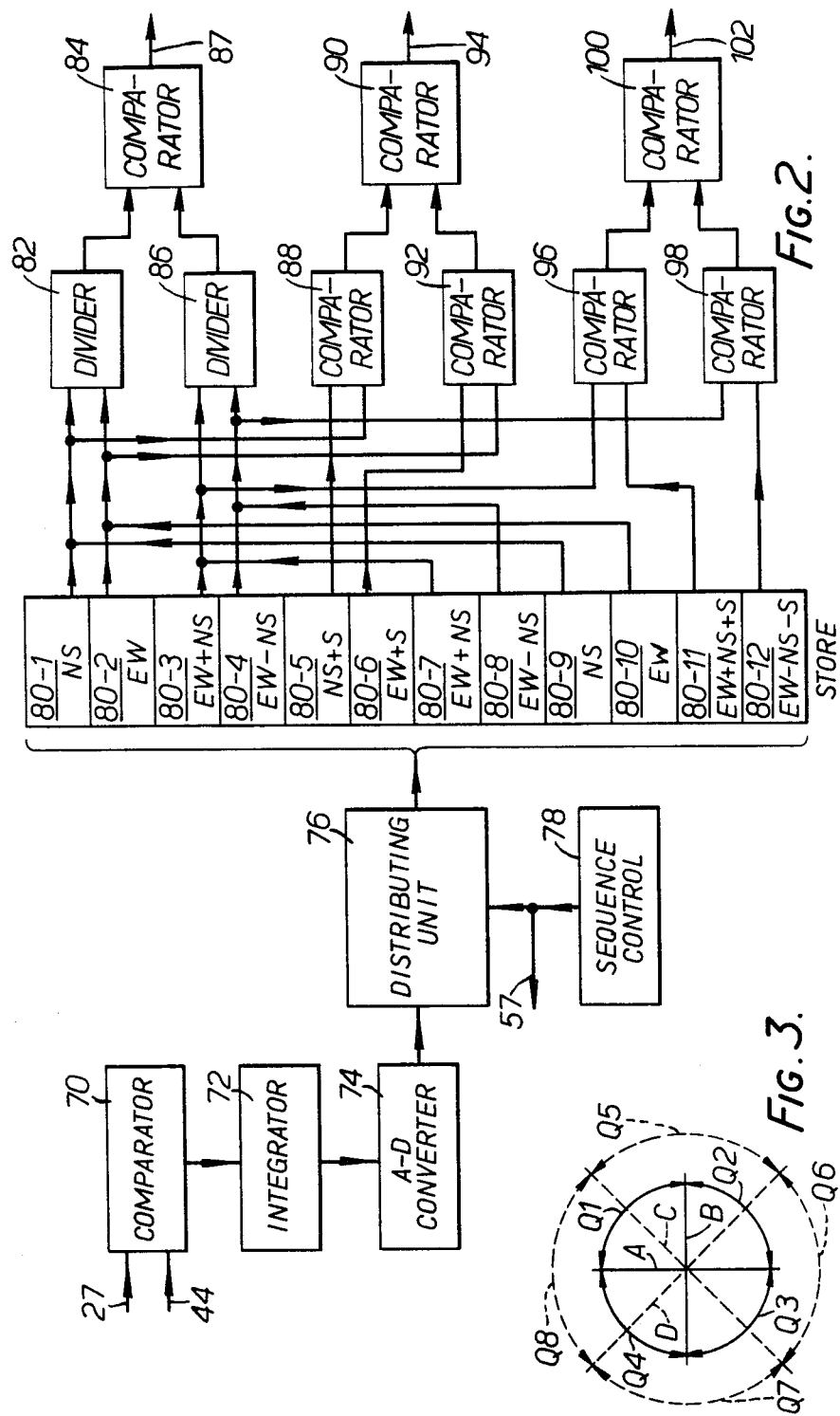

DIRECTION FINDING

BACKGROUND OF THE INVENTION

The invention relates to direction finding systems and methods for sensing the bearings of radio signals.

BRIEF SUMMARY OF THE INVENTION

According to the invention, there is provided a direction finding system for assessing the bearing of a received radio signal, comprising first and second antenna arrangements having response patterns arranged substantially at 90° to each other for receiving the said radio signal, signal processing means operative to produce a first output representing the radio signal as received by the first antenna arrangement during a first time period, signal processing means operative to produce a second output representing the radio signal as received by the second antenna arrangement during a second time period, and output means operative to compare the first and second outputs whereby to produce a bearing output signal representing the value of the said bearing.

DESCRIPTION OF THE DRAWINGS

Direction finding systems and methods according to the invention will now be described, by way of example, with reference to the accompanying drawings in which:

FIG. 2 is more detailed block circuit diagram of part of the system of FIG. 1; and FIG. 3 is a diagram of the compass axes for use in explaining the operation of the system.

DESCRIPTION OF THE PREFERRED EMBODIMENTS

Figure 1:
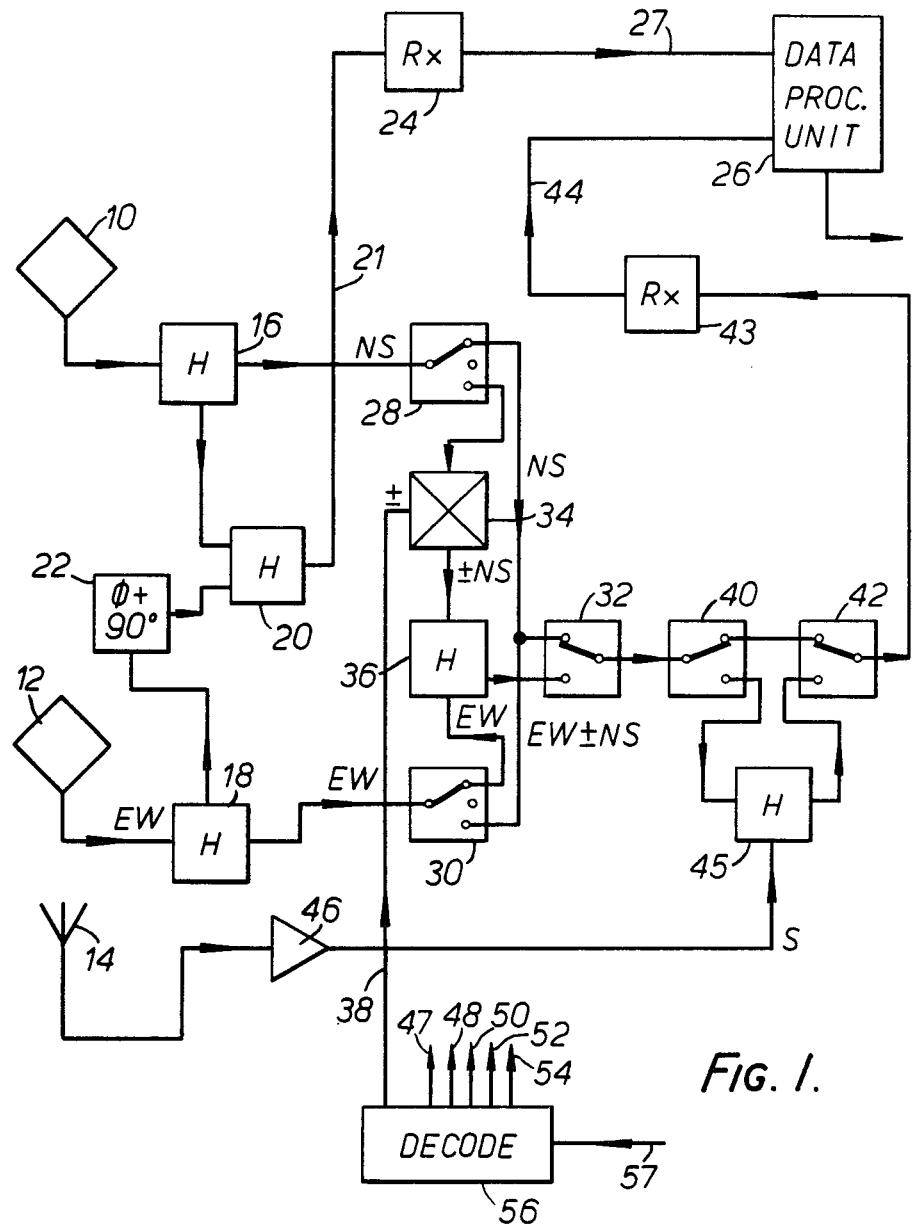
FIG. 1 is a block circuit diagram of one of the systems.

The systems to be described are primarily for finding the direction or bearing of a source of HF radio signals, but may be used with other frequency ranges.

The system to be described with reference to the Figures has two loop antennas 10 and 12, loop 10 being aligned with the north-south direction and loop 12 with the east-west direction, and an omnidirectional antenna 14. The outputs of the loops 10 and 12 are fed to respective hybrid transformers 16 and 18. One output of transformer 16 feeds one input of a hybrid transformer 20 whose other input is fed from one output of the hybrid transformer 18 via a 90 degrees phase shift circuit 22. The output of the hybrid transformer 20 on line 21 feeds the antenna input of a radio receiver 24 whose output is fed into a data processing unit 26.

In addition, the other outputs of the hybrid transformers 16 and 18 are fed into respective switches 28 and 30. Switches 28 and 30 each have an OFF setting and two ON settings. In one of its ON settings, switch 28 feeds the signal to a first input of a two-way switch 32, and switch 30 has one ON setting in which it also feeds its output to the first input of switch 32.

In the second ON setting of switch 28, it feeds its input signal through a unit 34 to one input of a hybrid transformer 36, and in the second ON setting of switch 30 it feeds its input signal into the other input of this hybrid transformer. The output of the hybrid transformer 36 feeds the second input of switch 32.

Unit 34 can be set by means of a control signal on a line 38 so as either to pass the signal from switch 28 unchanged or to invert it.

The output of switch 32 is fed through two further two-way switches 40 and 42 to the antenna input of a radio receiver 43 and thence to its data processing unit 26 on a line 44. With the switches 40 and 42 in their first settings (as illustrated), they pass the signal straight through to receiver 43. When the switches are in their second settings, the signal is passed through a hybrid transformer 45 where it is summed with the output of an amplifier 46 amplifying the output of the omnidirectional antenna 14.

The switches 28, 30, 32, 40 and 42 may, for example, be in the form of field effect transitors, and control signals for setting the switches are produced on lines 47, 48, 50, 52 and 54 by means of a control unit 56 which is controlled by the data processing unit 26 via a line 57. The operation of the system will now be described.

If the output signal from the loop 10 is designated NS and the output signal from the loop 12 is ddesignated EW, and if it is assumed that the received radio signal makes an angle of 0 with the loop 10, then $$NS = M \cos \omega t \cdot \cos \theta,$$

and $$EW = M \cos \omega t \cdot \sin \theta$$

where M is the amplitude modulation.

Because of the presence of the 90° phase shifter 22, the output of the hybrid transformer 20 on line 21 will be given by $$R = M \cos (\omega t - \theta)$$

The output R on line 21 is fed continuously to receiver 24 and the resultant modulation output fed into the data processing unit 26 on a line 27. However, the signals NS and EW are not fed continuously to receiver 43 but are selected by the switches 28, 30, 32, 40 and 42 in a particular sequence, described below, and applied to the receiver and thence passed to the data processing unit 26 in that sequence. The sequence has twelve steps, and the following Table shows the output fed to receiver 43 during each such step.

TABLE

| STEP | INPUT OF RECIEVER 43 |
|---|---|
| 1 | NS |
| 2 | EW |
| 3 | EW + NS |
| 4 | EW − NS |
| 5 | NS + S |
| 6 | EW + S |
| 7 | EW + NS |
| 8 | EW − NS |
| 9 | NS |
| 10 | EW |
| 11 | EW + NS + S |
| 12 | EW − NS + S |

FIG. 1 shows that the signals NS and EW can each be selected by setting the respective one of switches 28 and 30 into the appropriate one of its ON settings and leaving the other switch OFF, the switches 32, 40 and 42 being left in the positions shown in FIG. 1. To select (EW + NS), switches 28 and 30 are set so as to pass the signals NS and EW into the hybrid transformer 36 and the output is selected by changing over the position of switch 32 from the position illustrated. The signal (EW−NS) is selected in similar fashion except that the control signal on line 38 is set so as to cause the unit 34 to invert the signal NS. When the sequence requires the output S of the sense antenna 14 to be added, this is achieved by changing over the settings of the switches 40 and 42 from those illustrated in FIG. 1.

The exact manner in which the data processing unit 26 operates will be explained in detail below with reference to FIG. 2. Basically, however, it uses the signals received during Steps 1-4 and 7-10 to calculate the bearing and uses the signals during Steps 5 and 6 and 11 and 12 to resolve ambiguities.

Thus the outputs of the receiver 43 can be represented as $$NS = M \cos \theta, \; EW = M \sin \theta, \; \text{and} \; (EW \pm NS) = (M \sin \theta \pm M \cos \theta).$$

Therefore, it will be apparent that the outputs from loops are:

$$EW = M|\sin \theta|$$

and $$NS = M|\cos \theta|$$

In addition, $$EW + NS = M|\sin \theta + \cos \theta|$$

and $$EW - NS = M|\sin \theta - \cos \theta|$$

The bearing from the EW, NS pair, $\theta_a$, is calculated as follows:

$$\theta_a = \arctan \frac{EW}{NS} = \arctan \left| \frac{\sin \theta}{\cos \theta} \right|$$

$$= \pm \theta + n\pi \text{ where } n \text{ is an integer number.}$$

The bearing from the EW±NS pair, $\theta_b$, is calculated as follows:

$$\theta_b = \left( \arctan \frac{EW - NS}{EW + NS} \right) + \frac{\pi}{4}$$

$$= \left( \arctan \left| \frac{\sin \theta + \cos \theta}{\sin \theta - \cos \theta} \right| \right) + \frac{\pi}{4}$$

$$= \left( \arctan \left| \frac{\tan \theta - 1}{\tan \theta + 1} \right| \right) + \frac{\pi}{4}$$

Now $\tan(\theta - \pi/4) = (\tan \theta - 1)/(\tan \theta + 1)$ $$\theta_b = \left( \arctan \left| \tan \left( \theta - \frac{\pi}{4} \right) \right| \right) + \frac{\pi}{4}$$

$$= \left( \pm \left( \theta - \frac{\pi}{4} \right) + n\pi \right) + \frac{\pi}{4}$$

$$= \pm \left( \theta - \frac{\pi}{4} \right) + \pi(n + \tfrac{1}{4})$$

Each of the foregoing calculations for $\theta_a$ and $\theta_b$ will give an angle which can lie in any one of the four quadrants, that is, it will give four possible bearing directions. Thus Equation (1) gives one bearing direction in each of the four quadrants Q1, Q2, Q3 and Q4 defined by the north-south axis A and the east-west axis B, see FIG. 3, while Equation (2) produces one bearing direction in each of the four quadrants Q5, Q6, Q7 and Q8 defined by axes C and D displaced by 45° from the north-south and east-west axes A and B. However, two of the four different values for $\theta_a$ will the same as two of the four values for $\theta_b$ (the other two values for $\theta_a$ differing from the other two values for $\theta_b$), the two identical values defining a straight line passing through the origin of the north-south and east-west axes. Therefore, a comparison of the different values of $\theta_a$ and $\theta_b$ produces a result with only an ambiguity of sense.

In the foregoing analysis, it was assumed that the modulation M could be ignored. However, because the values which are compared (to produce the outputs $\theta_a$ and $\theta_b$) are values which are taken sequentially and not simultaneously, the value of M will change. It is for this reason that the output R is generated, by the hybrid transformer 20. The signal R will always represent the instantaneous value of M and can therefore be used to cancel the value of the M from each signal NS, EW and (EW+NS) before that signal is stored.

The signals stored during Steps 5, 6, 11 and 12 are used to resolve the sense ambiguity. This is done by carrying out a number of comparisons as explained with reference to FIG. 3. In FIG. 3, if the true bearing lies in quadrant Q1 or quadrant Q4, then (NS+S) will greater than NS, while if the true bearing lies in quadrant Q2 or Q3, then the value for (NS+S) will be less than S. Similarly, if the bearing lies in quadrant Q1 or Q2, then (EW+S) will be greater than EW alone, while if the bearing lies in quadrant Q3 or Q4, then the value for EW will be negative and (EW+S) will be less than EW alone. In this way, a check whether (NS+S) and (EW+S) are greater or less than NS and EW respectively will enable a determination of the quadrant in which the true bearing lies.

If the true bearing lies at the edge of one of the quadrants Q1, Q2, Q3 and Q4, that is, more or less along the direction of one of the two axes A and B, it will not be possible to use the above proces to identify the quadrant in which the true bearing lies. Therefore, a check is also carried out whether the values of the signals (EW+NS) and (EW−NS) are greater or less than (EW+(NS+S)) and (EW−(NS+S)) respectively, and this process enables the position of the true bearing to be established with respect to the four quadrants Q5, Q6, Q7 and Q8.

As there are twelve Steps in the sequence carried out by the data processing unit 26, the system is operating for two-thirds of the total time to determine the bearing and one-third of the time to determine sense. In order to achieve greater sensitivity, where noise is present or where the transmission being monitored is occurring in bursts for example, the system can be switched so that the signal S is not used. This is achieved by holding switches 40 and 42 continuously in the positions illustrated in FIG. 1. Therefore, for the whole of the time the system is determining the bearing. Of course, this means that there will be a possible 180° ambiguity in the sense of the bearing but this may be acceptable. For example, the operator may have other means of knowing the approximate direction of the bearing or he may be able to rotate his monitoring position in order to resolve the ambiguity.

FIG. 2 illustrates the data processing unit 26 in more detail.

As shown in FIG. 2, the unit 26 includes a comparator 70 which compares the instantaneous value of the modulation M, as received from receiver 24 (FIG. 1) with the instantaneous value of the signal received from the receiver 43—which will of course be the product of the instantaneous value of M and the bearing information (e.g. $\cos \theta$ in the case of the signal NS, $\sin \theta$ in the case of the signal EW). The comparator removes the modulation and passes on the remaining part of each signal from receiver 43 to an integrator 72. The integrator 72 integrates each signal over the length of time for which it is received (that is, one-twelfth of the total cycle length), and then an analogue to digital converter 74 produces a resultant digital output representing the integrated value. The analogue to digital converter 74 may for example comprise a voltage controlled oscillator (VCO) to the control input of which is fed the integrated output from the integrator 72. The VCO therefore produces an output frequency proportional to the integrated output and this frequency is counted into a digital counter to produce the required digital output.

The digital ouput is fed into a distributing unit 76 which is controlled by a sequence control unit 78 so as to feed each digital output into the appropriate stage of a store 80. The twelve storage locations 80-1 to 80-12 of the store 80 are labelled with the signal values which they respectively store and which correspond with the signal values identified in the Table above.

The outputs of the twelve storage locations are connected to appropriate comparators and calculating units as will now be explained.

The outputs of locations 80-1 and 80-2, and of locations 80-9 and 80-10, are connected to the inputs of a unit 82 which measures the ratio EW/NS and then determines the arctan of this ratio to produce the output $\theta_a$ in accordance wih Equation (1). This output is fed into a comparator 84.

Similarly, the outputs of storage locations 80-3, 80-4, 80-7 and 80-8 are fed into a unit 86 which measures the ratio (EW+NS)/(EW−NS), determines the arctan of this ratio and subtracts 45° to produce the output $\theta_b$ in accordance with Equation (2). This output is fed into the other input of comparator 84. Comparator 84 compares the values of $\theta_a$ and $\theta_b$ to resolve from the four possible values of each the two resultant values indicating the true bearing direction (but with sense ambiguity) as explained above in connection with Equations (1) and (2). It produces a resultant output signal on a line 87.

In order to resolve the sense ambiguity, a comparator 88 compares the signal in storage location 80-5 with the signals in storage locations 80-1 and 80-9 so as to determine whether the bearing lies in Quadrant Q1 or Q4 on the one hand, or in Quadrant Q2 or Q3 on the other hand (see FIG. 3). A resultant signal is fed into a comparator 90. Similarly, a comparator 92 compares the signal in storage location 80-6 with the signals in storage locations 80-2 and 80-10, to determine whether the bearing lies in Quadrant Q1 or Q2 on the other hand or in Quadrant Q3 or Q4 on the other hand. A resultant signal is fed into the second input of comparator 90 which is thus able to produce an output on a line 94 identifying the specific quadrant.

For additional accuracy, as explained, a comparator 96 is provided for comparing the signals in storage locations 80-3 and 80-7 with the signals in storage location 80-11, and a comparator 98 is provided for comparing the signals in storage locations 80-4 and 80-8 with the signals in storage location 80-12. The outputs of comparators 96 and 98 are connected to a further comparator 100 which produces an output on a line 102 indicating the identity of the particular one of the quadrants Q5 to Q8 in which the bearing lies.

The outputs on lines 87, 94 and 102 can be fed to any type of suitable output unit, such as a display unit and/or a data processing or control unit.

The output of the sequence control unit 78 is also connected to control the sequence unit 56 (FIG. 1) by means of line 57.

The system described enables a single receiver to be used for detecting the outputs of the two loops, instead of the two separate receivers which have to be used in other systems; in such other systems, it is necessary for the two receivers to be accurately matched in gain and phase and this may present problems.

The receiver 24 may be dispensed with if the received signal is not amplitude-modulated.

I claim:

1. A direction finding system for assessing the bearing of a received radio signal, comprising first and second fixed antenna arrangements having response patterns arranged substantially at 90° to each other and defining a first set of perpendicular axes for receiving the said radio signal, a single radio receiver, signal processing means operative to produce a first output representing the radio signal as received by the first antenna arrangement during a first time period, operative to produce a second output representing the radio signal as received by the second antenna arrangement during a second time period, operative to produce a third output representing the sum of selected proportions of the first and second outputs during a third time period, and operative to produce a fourth output representing the difference of selected proportions of the first and second outputs during a fourth time period, and output means operative to produce the ratio of the first and second outputs to derive a first set of four bearing angle values relative to said first set of axes, and operative to produce the ratio of the third and fourth outputs to derive a second set of four bearing angle values relative to a second set of perpendicular axes shifted by a selected angle relative to said first set of axes, whereby two of the bearing angle values of the first set coincide in space with two of the bearing angle values of the second set, such that the bearing of said received radio signal is one of said coincident bearing angle values.

2. A system according to claim 1, including a sense antenna arrangement operative to produce an output representing the magnitude of, but independent of the direction of, the received radio signal, and in which the signal processing means includes means responsive to this output to resolve ambiguity in the said bearing output.

3. A system according to claim 1, including means operative to sum the radio signals as received by both of the first and second antenna arrangements after phase-shifting one of them by 90° with respect to the other, whereby to produce an output having a magnitude which varies with any amplitude modulation on the radio signal but is independent of the bearing of the radio signal, and including means responsive to this output to render the said bearing outputs independent of any such amplitude modulation.

4. A system according to claim 1, in which the output means comprises means operative to measure the arctan of the ratio of the first and second outputs and means operative to measure the arctan of the ratio of the third and fourth outputs.

5. A system according to claim 1, in which said selected proportions are such that said third output is equal to the sum of said first and second outputs and the fourth output is equal to the difference of said first and second outputs, whereby said selected angle is 45°.

6. A direction finding system for assessing the bearing of a received radio signal, comprising:

first and second antenna arrangements having their response patterns mutually shifted by substantially 90° whereby to produce first and second outputs each having a magnitude dependent on any amplitude modulation on the received radio signal and on its bearing with respect to the response pattern of a respective one of the antenna arrangements;

a sense antenna arrangement operative to produce a third output dependent on the received radio signal but independent of its bearing, a commutating and combining arrangement connected to receive the first, second and third outputs and operative to produce a sequence of control signals each of which represents a respective one of the following: the first output, the second output, the sum of the first and second outputs, the difference between the first and second outputs, the difference between the first and second outputs, the sum of the first and third outputs, and the sum of the second and third outputs;

means responsive to the first and second outputs to produce a fourth output having a magnitude dependent on any amplitude modulation on the received radio signal but independent of its bearing; and signal processing means responsive to the fourth output and the said control signals and comprising first means operative to compare particular pairs of the control signals which are not dependent on the said third output whereby to produce a bearing output dependent on the bearing of the received radio signal but independent of its sense, second means operative to compare the values of specific pairs of the control signals, one of each such pair being a control signal not dependent on the said third output and the other thereof being a control signal dependent on the said third output, whereby to determine the sense of the bearing represented by the said bearing output, and third means responsive to the said fourth output to render the values of the said control signals independent of any amplitude modulation.

7. A system according to claim 6, including means selectively operable to set the commutating and combining means to be unresponsive to the said third output whereby the control signals previously dependent on the said third output are rendered independent thereof, so that the said second means is rendered incapable of determining the sense of the bearing.

8. A system according to claim 6, including a radio receiver connected to receive and demodulate each said control signal before feeding it to the signal processing means.

9. A system according to claim 8, including a further radio receiver connected to receive and demodulate the fourth output and to feed the demodulated output to the signal processing means.

10. A system according to claim 6, in which the said first means includes means for measuring the arctan of the ratio of the control signal dependent on the first output and the control signal dependent on the second output to produce a first bearing angle signal, and means for measuring the arctan of the ratio of the control signal dependent on the sum of the first and second outputs and the control signal dependent on the difference between the first and second outputs and subtracting an amount representing 45° from the resultant angle to produce a second bearing angle signal.

11. A system according to claim 10, in which the first means includes means for comparing the first and second bearing angle signals to produce the said bearing output.

* * * * *